United States Patent [19]

Baer

[11] Patent Number: 4,946,180
[45] Date of Patent: Aug. 7, 1990

[54] CONVERTIBLE CHILD SUPPORT APPARATUS

[76] Inventor: Luke Baer, 11330 Corner Brook Ct., Reno, Nev. 89511

[21] Appl. No.: 200,946

[22] Filed: Jun. 1, 1988

[51] Int. Cl.$^5$ ............................ B62B 9/12; B62B 7/00
[52] U.S. Cl. ......................................... 280/39; 280/43; 280/47.18; 280/47.25; 280/47.371; 280/47.38; 280/47.4; 297/484; 297/488; 297/162; 297/155
[58] Field of Search .................. 280/30, 31, 638, 639, 280/38, 39, 647, 648, 650, 657, 658, 43, 47.34, 47.37, 47.38, 47.4, 47.41; 297/484, 487, 488, 162, 155, 411, 422

[56] References Cited

U.S. PATENT DOCUMENTS

| 862,711 | 8/1907 | Collier | 280/39 |
|---|---|---|---|
| 2,900,011 | 8/1959 | Casey | 297/155 |
| 3,463,504 | 8/1969 | Petry et al. | 280/31 |
| 3,524,655 | 8/1970 | Ballenger | 280/47.38 |
| 4,288,123 | 9/1981 | Cone | 297/162 X |
| 4,662,683 | 5/1987 | Knoedler et al. | 297/488 |
| 4,754,999 | 7/1988 | Kain | 297/487 X |

FOREIGN PATENT DOCUMENTS

| 2210492 | 9/1973 | Fed. Rep. of Germany | 297/471 |
|---|---|---|---|
| 193731 | 1/1965 | Sweden | 297/471 |
| 594858 | 11/1947 | United Kingdom | 280/39 |

Primary Examiner—Charles A. Marmor
Assistant Examiner—Tamara L. Finlay
Attorney, Agent, or Firm—Bernard L. Kleinke; William Patrick Waters; Jerry R. Potts

[57] ABSTRACT

A child support apparatus for use as a safety car seat, stroller, highchair and crib. The apparatus has telescoping legs with retractable wheels and pivotable handles which may be extended to function as a stroller or retracted and pivoted to become a safety car seat. The apparatus has a restraining tray assembly adapted to receive a safety harness to provide an auxiliary safety feature that may be utilized if the harness is not fastened or accidentally comes loose from its normal male-female mating machanism. The trays associated with the restraining tray assembly are adjustable and rotatable to provide access to the unit's seat or as an extension for the apparatus' side arms when the unit is used as a crib. The retractable wheels are adapted with telescoping legs which may be extended to allow the unit to function as a highchair.

9 Claims, 2 Drawing Sheets

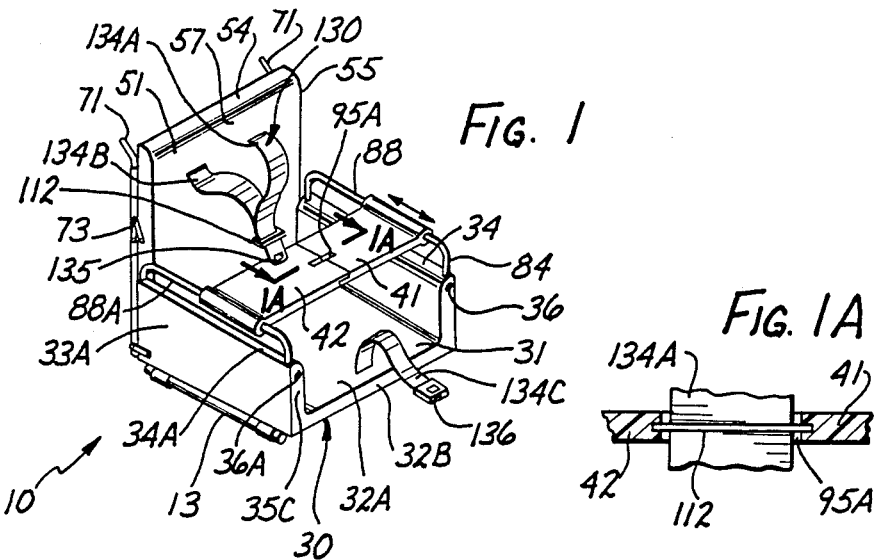
FIG. 1
FIG. 1A
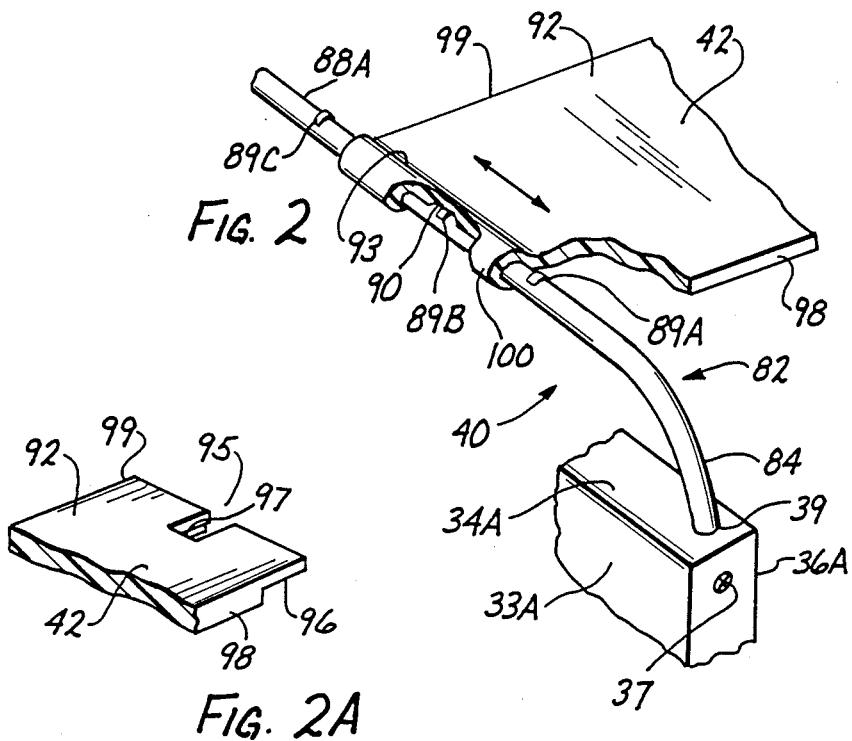
FIG. 2
FIG. 2A

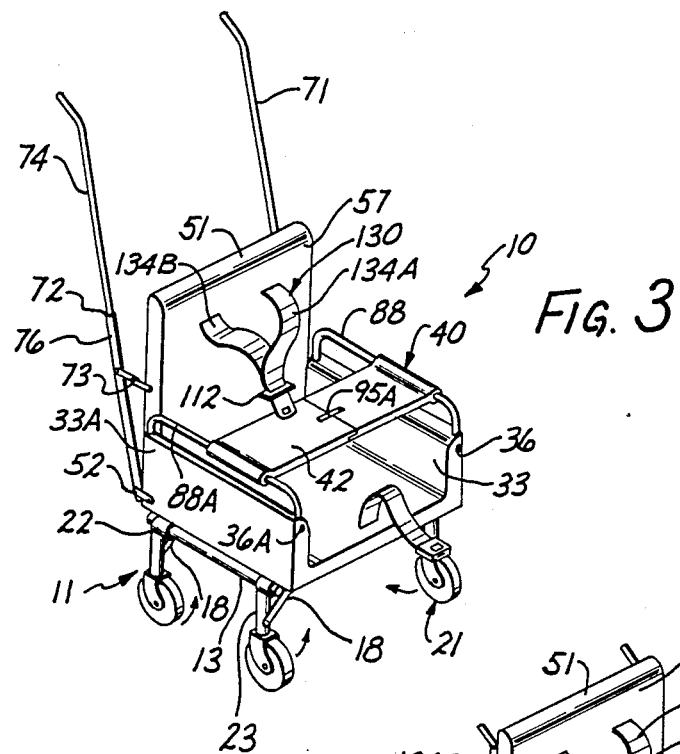
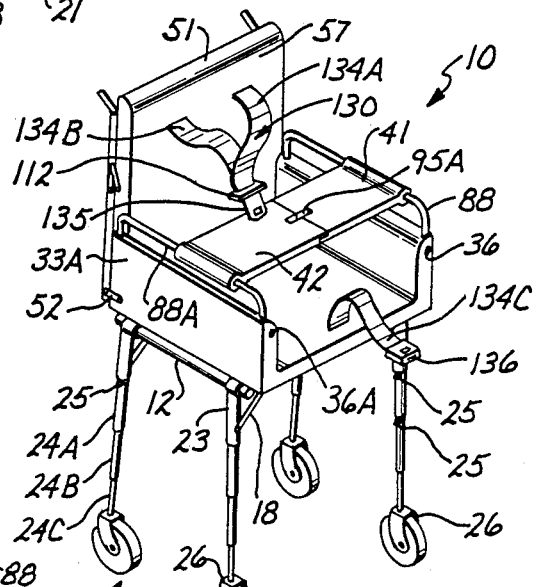
FIG. 3
FIG. 4
FIG. 5

CONVERTIBLE CHILD SUPPORT APPARATUS

DESCRIPTION

1. Technical Field

This invention pertains to the general field of infant carriers such as car safety seats and strollers. More particularly, it relates to a convertible child support apparatus that can function in a plurality of child support configurations, and that can be readily converted from one configuration form to another.

2. Background Art

Babies and young children present unique problems in terms of the various support apparatus they require for their normal maintenance and care. For example, because of numerous injuries which have been suffered by children traveling in automobiles, both federal and state laws have been enacted requiring infants and young children to wear safety belts and to be confined in infant car safety seats designed to specific standards to assure they are provided with adequate protection in the event of accidents. Because of such requirements, it has become normal practice for parents and other responsible persons, to purchase infant car seats, which comply with federal and state requirements.

It also is common practice for a baby to be placed in a stroller once the baby has been transported to a given destination by automobile. For example, if the baby is transported to a shopping mall, the baby is usually placed in a stroller for transportation through the mall. To make the transition from the automobile to the stroller, the baby must be lifted and removed from the car safety seat in the automobile, and placed in the stroller which frequently results in the baby awakening after having fallen asleep in the vehicle. Also, while shopping in the mall, it may become necessary to feed the baby. To accomplish this task, the baby is usually lifted from the stroller and placed in a high chair for feeding. Later, the baby is then returned to the stroller. Finally, if the baby has fallen asleep in the stroller, it may be necessary to place the baby in a crib, which again requires the baby to be lifted from the stroller and placed in the crib, thereby awakening the baby.

Because of these typical child care requirements, a number of different types of support equipment is required, especially when travelling with infants and small children. However, in view of modern small automobiles, such a requirement is not only burdensome, but also, in many situations, may be impossible to accomplish.

Therefore, it would be highly desirable to reduce the expense associated with purchasing individual support devices, as well as to have a convertible support apparatus, which could be easily transported in an automobile and yet still provide all of the various support requirements of a small child.

There have been many different types and kinds of prior known devices which have attempted to solve, in various manners, the foregoing problems. For example, reference may be made to the following U.S. Pat. Nos.:

| U.S. Pat. No. | Inventor | Issued |
|---|---|---|
| 4,685,688 | Edwards | August 11, 1987 |
| 4,679,804 | Johnson | July 14, 1987 |
| 4,647,054 | Chong | March 3, 1987 |
| 4,632,409 | Hall, et al. | December 30, 1986 |
| 4,620,711 | Dick | November 4, 1986 |
| 4,568,122 | Kain | February 4, 1986 |
| 4,231,612 | Meeker | November 4, 1980 |
| 4,072,345 | Matsuda | February 7, 1980 |
| 3,976,328 | Stahel | August 24, 1976 |
| 3,873,117 | Perego | March 25, 1975 |
| 3,336,039 | Chute et al. | August 15, 1967 |
| 3,109,666 | Wilson | November 30, 1960. |

For example, the Edwards Pat. No. 4,685,688 discloses a combination stroller and car safety seat with telescoping legs, to function as both a stroller and a child safety car seat. Similarly, the Chong Pat. No. 4,647,054 also discloses a combination stroller and car safety seat where the apparatus is secured in place on an automobile seat by a telescopically descendible pushing handle and an opposed anchoring bar disposed at the bottom rear of a framework.

The Hall, Meeker, Stahel and Perego patents also disclose various combination child support devices. Thus, although there have been numerous prior known devices none of them achieve the desired results of the present invention. In this regard, conventional child support equipment can not, in one unit, perform many or all of the foregoing functions desired for the proper care of the child in many different situations.

DISCLOSURE OF INVENTION

It is therefore an object of the invention to provide a new and improved child support apparatus, which can be convertibly structured for multiple modes of operation in a convenient manner.

It is a further object of the present invention to provide such a new and improved child support apparatus, which converts from one mode of operation to another easily and quickly, which is compact so as to be easily transported in a small automobile; and which is relatively inexpensive to manufacture.

Briefly, the above and further objects are realized by providing a convertible child support apparatus which can readily function in four distinct operating modes: a car safety seat, an infant bed or crib, a stroller, and a high chair. The apparatus can be quickly converted from one form to another. A restraining tray assembly enables the apparatus to operate in combination with a safety harness to provide an auxiliary safety mechanism. An undercarriage assembly allows the wheels of the inventive apparatus to be pivotally retracted or extended as required. In a wheels retracted position, the apparatus serves as a crib or automobile infant seat. When the wheels are extended, the apparatus functions as a baby stroller. By projecting the wheels, on telescoping legs, the inventive apparatus functions as a high chair.

BRIEF DESCRIPTION OF DRAWINGS

The above mentioned and other objects and features of this invention and the manner of attaining them will become apparent, and the invention itself will be best understood by reference to the following description of the invention in conjunction with the accompanying drawings, wherein:

FIG. 1 is a pictorial view of a child support apparatus, which is constructed according to the present invention, and which is illustrated in an automobile seat configuration with the wheels and legs in the retracted position;

FIG. 1A is an enlarged sectional view of a restraining tray assembly of the apparatus of FIG. 1, taken substantially on line 1A—1A thereof, illustrating the tray assembly in its closed position;

FIG. 2 is an enlarged pictorial fragmentary view of the restraining tray assembly of FIG. 1, showing detents and notches for controlling horizontal movement of the restraining tray;

FIG. 2A is an enlarged pictorial fragmentary view of the restraining tray assembly of FIG. 1, showing a beveled end and notch for receiving a restraining harness;

FIG. 3 is a pictorial view of the apparatus of FIG. 1, depicting it in a baby stroller configuration with its legs and wheels in an extended position;

FIG. 4 is a pictorial view of the apparatus of FIG. 1, depicting it in a high chair configuration with its legs in a fully extended position; and FIG. 5 is a pictorial view of the apparatus of FIG. 1, depicting it in a crib configuration with its legs and wheels in a fully retracted position.

BEST MODE FOR CARRYING OUT THE INVENTION

Referring now to the drawings, and more particularly to FIGS. 1, 3, 4 and 5 thereof, there is shown a convertible child support apparatus 10 which is constructed in accordance with the present invention.

The convertible child support apparatus 10 is readily convertible for use as an infant automobile safety seat (FIG. 1), a baby stroller (FIG. 3), a high chair (FIG. 4), or an infant car bed (FIG. 5).

The apparatus 10 generally comprises an undercarriage assembly 11 equipped with retractable wheel units 21, mounted under a seat 30. A restraining tray assembly 40 is disposed on the seat for restraining an occupant therein. A seat back 51 is pivotally connected to the seat, and a pair of foldable and telescoping handles 71 are connected to the seat back and seat for facilitating the pushing the support apparatus 10 when configured as a baby stroller.

In operation, the convertible support apparatus 10 can easily be converted from one mode of operation to another, as will be described with reference to FIGS. 1-5. Considering now the procedure for converting the apparatus 10 from its car seat mode of operation (FIG. 1) to a stroller configuration (FIG. 3), the front and rear retractable wheel units 21 are first extended to a wheels down position by pivoting each of the support tube legs 23 from beneath the undercarriage 11, and then to a locked downwardly depending position by foldable links 18 for each leg. The telescoping handles 71 located on the backside of seat back 51 are then pivoted about a pivot pin (not shown) below link 52, and telescoped at 72, to a fully extended and locked position. The handles 71 are then pulled away from the rear of seat back 51 and locked by links 73 and 52 into the position shown in FIG. 3 wherein the handles 71 may be utilized to facilitate the pushing of the support apparatus in its stroller configuration.

In order to convert the unit from the vehicle seat of FIG. 1 into a high chair of FIG. 4, the front and rear support tube legs 23 are lengthened telescopically, by sliding manually a set of extension tubes such as the tubes 24A, 24B, and 24C on each leg into a fully extended position. Spring loaded buttons 25 on the extension tubes are used to lock the extension tubes 24A, 24B and 24C in their telescoped position To retract the extension tubes from their telescoped fully extended position as shown in FIG. 4 to their fully retracted position as shown in FIG. 3, each one of the spring loaded buttons are depressed thereby retracting the extension tubes. Once the extension tubes have been retracted, a set of leg braces or pivotable links, such as the link 18, are unlatched and then the front and rear wheel units 21 are retracted by pivoting the support tube legs 23 to a position beneath the undercarriage 11. A pair of braces or pivotable links 52 and 73 are unlatched and the handles 71 can be pushed back flat against the rear of seat back 51. The handles 71 are then, un and pivoted about a pivot pin to below link 52 the position shown in FIG. 1 where the support apparatus is shown in its car seat configuration.

In order to convert the unit to a crib as shown in FIG. 5, the restraining trays 41 and 42 can be pivoted or swung to an opened position as shown in FIG. 5. The seat back 51 is pivoted to a horizontal position coplanar with the seat base portion 31, about link 75 to place the apparatus in the crib configuration illustrated. A pair of braces or pivoting links 75A help retrain the back in the horizontal crib position.

The operation of the restraining trays 41 and 42 will now be described with reference to FIGS. 1, 1A, 2 and 5. The restraining trays 41 and 42, when in the horizontal use position illustrated in FIG. 1, function as a restraining arm rest. To permit a baby to be placed in the car seat configuration shown in FIG. 1, the respective restraining trays 41 are 42 manually swung about their respective support light portions 88 and 88A to the downwardly depending position shown in FIG. 5, where they are out of the way to permit access to the unit.

In order to position adjustably the trays on the supports, a set of detents, such as the detents 89A, 89B and 89C on the rodlike support bight 88A, cooperate with internal grooves, such as a groove 90, disposed on the inside of tubular tray extensions, such as the extension 100.

Considering now seat 30 in greater detail with reference to FIG. 1, the seat 30 is generally U-shaped and of unitary construction and includes a base portion 31, and a pair of parallel spaced apart integrally formed arms 33 and 33A each projecting generally upwardly and perpendicularly from the side marginal edges of the base 31, terminating in upper edges 34 and 34A having generally flat surfaces. Although not illustrated in the drawings, the base 31 may be covered by means of a pad (not shown) which extends in overlying relationship with the base portion 31 and upwardly along the interior of the arms 33 and 33A. The pad may be secured by any suitable securing means (not shown).

The base portion 31 of seat 30 is generally an integrally formed smooth flat body section of uniform cross sectional thickness defined by a top surface 32A, a bottom surface (not shown), a front edge 32B, and a rear edge (not shown). The rear edge is mitered to enable the mating edge of the seat back 51 to enable the back 51 to fold down into a horizontal position flush with the base 31, as shown in FIG. 5.

The bottom surface of the seat 31 has wells (not shown) for receiving the wheel units 21 when they are in their fully retracted position. As further illustrated in FIG. 1, a safety belt 134C having one end fixed to the base 31 and having a conventional female clip or buckle 136 on its free opposite end. A metal, tongue 135 of a harness 130 affixed to the seat back 51 is adapted to engage in a latching manner with the buckle 136 to restrain the baby seated in the unit 10, as well as to hold down the trays 41 and 42, as hereinafter described in greater detail.

Considering now the support arms 33 and 33A in greater detail as shown in FIG. 1, the arms 33 and 33A are similar to one another, and only the left arm 33A will now be described in greater detail. The arm 33A generally is an integrally formed smooth flat vertical body section of uniform cross sectional thickness, which is rectangular in face view and has an upper edge 34A. A front edge portion 35C and a rear edge portion are symmetrical and similar to one another and only the front portion will be described in greater detail. The front edge portion 35C is generally a flat surface having a socket or hole 36A therein generally disposed near the upper marginal edge adjacent to the edge 34A. A similar hole 36 is disposed in the arm 33.

Considering now the edge 34A in greater detail as shown in FIG. 1, the edge 34A extends generally in a horizontal plane parallel to the upper planar surface 32A of the base portion 31 having marginal edges disposed at the front edge 35C and rear portions of the support arm 33A. As shown in FIG. 2, the upper edge 34A has two holes, such as the hole 39, equally spaced from each respective marginal ends and adjacent to the socket 36A. The holes are adapted to receive fixedly the downwardly turned ends of the spaced apart side portions 84 and 86 of a rodlike U-shaped frame 82 of restraining arm assembly 40 (FIG. 2).

As illustrated in FIG. 1, the U-shaped tubular frame 82 has a bight top portion 88A. The downturned ends of the spaced apart side portions 84 and 86 fit into the holes such as the hole 39, and are secured to the arm 33A by screws, such as the screw 37 which has its head seated in the socket 36A. Each respective one of the ends of the spaced apart side portions 84 and 86 passes through the lower planar surface of the base 31 and is fastened securely to the undercarriage 11 by any standard securing means (not shown), thereby forming a rigid and protective frame.

As further illustrated in FIGS. 2 the bight portion 88A of the frame 82 has the plurality of equally spaced detents 89A, 89B, and 89C, which are adapted to limit the horizontal forward and backward movement of the restraint tray assembly 40. As shown in FIG. 2, the detents 89A and 89B generally extend circumferentially from the top bight portion 88A of the frame 82 inwardly base 32 and terminating at a point slightly below the horizontal axis of the top tubular portion 88A. The detent 89C extends circumferentially to a point 180 degrees opposite its starting point on the top surface.

Considering now trays 41 and 42 in greater detail, each one of the trays 41 and 42 are similar to one another with respect to the frame 82, and only the left tray 42 will now be described.

Referring to FIGS. 2 and 2A, the tray 42 comprises generally a flat body section 92 of uniform cross sectional thickness, which is rectangular in its face view and is defined by an arm edge 93, a mating edge 96, front edge 98 and rear edge 99. The arm edge 93 includes an integrally connected tubular portion 100.

As il FIG. 2, the tubular portion 100 is slidably mounted on the bight portion 88A to permit forward and rearward movement of the tray 42 along the bight portion 88A of the frame 82. A notch 90 is disposed in the interior circumferential surface of the tubular portion 100 of tray 42 and is adapted to engage detents 89A, 89B and 89C to limit the horizontal forward and backward movement of the tray 42 as it sides along the bight portion 88A. It should be understood that Detents 89A, 89B and 89C, releasably latch the left tray 42 in one of three horizontal positions, depending on which detent is received within the internal notch 90. In this manner, when tray 42 is positioned in mating engagement with the right tray 41 to help restrain the occupant in the seat, both trays can be moved forwardly and backwardly adjustably to provide a variable space between the front portion 57 of the seat back 51 and rear edges, such as the edge 99 of the tray 42.

Referring now to FIGS. 1, 1A and 2A, the body sections of the trays 41 and 42 will now be described. Only the tray 42 will now be described. The left tray 42 has a notch or opened slot 95 at its marginal free side edge 96. Notch 95 has a pair of internal grooves, such as the groove 97 which is adapted to receive a safety plate 112. As illustrated in FIG. 1, when trays 41 and 42 are brought into mating engagement, a hole or opening 95A is formed by each respective notch such as the notch 95. Hole 95A is generally rectangular in shape and of sufficient width to receive a safety harness strap and 134B.

As illustrated in FIG. 1, the mating edges such as the edge 96 of the trays 41 and 42 are each undercut in a complementary configuration to interengage with one another to enable the trays to fit together in secure mating relationship at their free end edges.

Considering now the seat back 51 in greater detail with reference to FIG. 1, the seat back 51 includes a backrest body of uniform cross sectional thickness. The back 51 is rectangular in face view and is defined by a side edge 55, a front surface 57, and a back surface 54. The bottom edge of the seat back 51 adjacent to the base 31 is beveled to enable the body of seat back 51 to engage a complementary shaped adjacent edge of the base 31. Each one of the handles 71 is tubular and includes an upper section 74 and a lower section 76. The upper section 74 is telescopically connected to the lower section 76 at 72.

The lower section 76 of the handle is attached by its upper end to the side edge 55 of the seat back 51 by a first pivotal link 73 and by its lower end to the support arm 33A by a second pivotal link 52.

As illustrated in FIG. 1, the safety harness 130 generally includes two straps 134A and 134B secured in a V-shaped configuration and are joined at their lower ends at the male seat belt tongue 135. The opposite upper ends of the straps are fixedly secured to the seat back body 54 by suitable securing means (not shown).

In operation, the safety plate 112 is slid within the grooves, such as the groove 97, and then trays 41 and 42 are swung downwardly into their horizontal use position. When the trays are brought into engagement, the safety plate 112 is secured between trays 41 and 42 within the opening 95A thereby securing the occupant into the car seat. This provides an added safety feature in the event the seat belt harness 130 is not fastened or accidentally becomes unsecured. Thereafter, the tongue and the buckle of the harness are interengaged in a releasable manner.

Consider now the undercarriage 11 in greater detail with reference to FIGS. 1, 3, and 4, the undercarriage generally includes a U-shaped frame 12 with, equally spaced apart side portions, such as side portion 13 considered as belonging to more than one of the portions of the frame 12. Specifically, the frame 12 is bent in a manner such that it constitutes part of the side that extend along the underside of the seat 30 adjacent its rear and side portions. The frame 12 is rigidly connected to the bottom surface of the base 31 adjacent its rear peripheral edge. Wheel units 21 are pivotally attached to the front and rear of each respective side portion of the frame 12 by rotating support tube legs 23 which rotate perpendicularly about the horizontal axis of the side portions. Each support tube leg 23 is adapted with a fold out lock hinge 18 which locks the support tube leg 23 in straight perpendicular relation to the planar bottom surface of the base 31 when extended and in an inclined position when closed, so as to secure the legs 23 within the containing wells (not shown) of the base 31.

Referring now to the stroller configuration shown in FIG. 3, the handles 71 telescoped at 72 into their fully extended positions and then pulled away from the seat back by extending the lever arms of links 73 and 52 into their locked position as illustrated in FIG. 3. The wheel units 21 are deployed by the user grasping each support tube leg 23 and rotating the leg 23 downwardly into a perpendicular relation to the bottom surface of the base 31 and locking the leg into position with lock hinge 18. With this arrangement, the support apparatus is rollably supported above the ground or other support surface, and may be pushed by its handles to cause the unit to roll along the ground on its wheels.

Considering now the wheel unit 21 in greater detail, each one of the wheel units 21 are similar to one another with respect to each of the side frames portions of the frame 12, such as side portion 13, and only one wheel unit 21 will now be described with respect to side 13. Referring now to FIG. 4, wheel unit 21 includes a pivot tube 22, which slides over the side portion 13 and rotates perpendicularly about the horizontal axis of the side portion 13. The wheel unit 21 further includes a support tube leg 23; a plurality of extension tube legs 24A, 24B, and 24C, each of which is approximately equal in length but smaller in diameter. Thus, leg 24A is contained within the interior hollow of support tube leg 23; leg 23B is contained within the interior hollow of leg 24A; and leg 23C is contained within the interior hollow of 24B; and a wheel assembly 26 depending from leg 24C.

A spring loaded button 25 on each respective extension tube leg 24A, 24B, and 24C snaps out as each respective leg is telescopically extended, thereby rigidly fixing each extension. In this manner, the child support apparatus can easily and quickly be converted from its baby stroller configuration as illustrated in FIG. 3 to its high chair configuration as shown in FIG. 4.

It can also be seen in FIGS. 3 and 4 that the extension legs 24A, 24B, and 24C are easily retracted by depressing the spring loaded device 25 associated with each respective extension, to reconvert the high chair back to the stroller configuration.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A convertible child support apparatus comprising: an undercarriage;
base means supported by said undercarriage for accommodating and supporting an occupant;
restraining means disposed on said base means for restraining an occupant thereof when the apparatus is used as an automobile infant seat;
said restraining means including support means rigidly secured to said base means and to said undercarriage, tray means for permitting an occupant to be received within said base means, means for mounting said tray means swingably to said support means and adapted to slide on said support means, and means for securing said tray means releasably to said support means, whereby an occupant supported in said base means may be restrained in the apparatus; and
wherein said base means is generally U-shaped having an integrally formed base and equally spaced support arms projecting generally upwardly and perpendicularly from said base, terminating in an outwardly turned rim having a generally flat surface having holes means for mounting said restraining means to said base means.

2. A convertible child support apparatus as recited in claim 1, wherein said securing means is detente and notch means, and said base means includes a seat.

3. A convertible child support apparatus comprising: an undercarriage;
a seat supported by said undercarriage for accommodating and supporting a small child; and
restraining means disposed on said seat for restraining an occupant thereof when said apparatus is used as an automobile infant seat;
wherein said seat is generally U-shaped having an integrally formed base and equally spaced support arm projecting generally upwardly and perpendicularly from said base, terminating in an outwardly turned rim having a generally flat surface having a pair of holes for mounting said restraining means onto said seat;
wherein said restraining means includes a pair of opposed restraining arm assemblies each having: a U-shaped tubular frame comprising an integrally formed top portion having at least one detente disposed thereon and spaced apart side portions, each respective side portion having a downturned end for being received in one of said holes and rigidly secured to said support arm and said undercarriage, and a restraining tray having a tubular portion with an integrally formed notch;
said tubular portion surrounding a portion of said tubular frame for supporting said tray slidably along the top portion of the frame;
wherein when the restraining tray of one of the arm assemblies is disposed in mating arrangement with the restraining tray of the oppositely disposed arm assembly, said trays assist in restraining an occupant of said seat when said notch is disposed in said detente.

4. A convertible child support apparatus as recited in claim 3 wherein each restraining tray has a slot, said slots defining a hole when said trays are disposed in a mating arrangement.

5. A convertible child support apparatus as recited in claim 4, wherein each of said slots has a groove adapted to receive a portion of a safety plate.

6. A convertible child support apparatus as recited in claim 4, wherein said apparatus further includes a seat back having an integrally formed seat belt comprising a safety plate and a male safety belt clip and said seat further includes an integrally formed safety belt with a female safety belt clip for engaging said male clip thereby securing an occupant in said seat.

7. A convertible child support apparatus as recited in claim 6 wherein a portion of said safety plate is disposed in each of said slots when said trays are disposed in mating arrangement thereby securing said safety plate to said trays.

8. A convertible child support apparatus as recited in claim 6, further comprising:
- a U-shaped frame with equally spaced apart side portions, said frame being connected to said undercarriage; and
- a plurality of wheel units each having a wheel and being rotatably secured to said U-shaped frame, said wheel units being rotatable from a secured position beneath said seat to an extended downwardly position perpendicular to said seat, whereby said wheels are disposed for supporting rollably said apparatus when used as a stroller;
- a pair of handles, each handle having an upper and a lower portion telescopically connected to each other to extend the upper portion of the handle from a retracted position to an extended upright position; and
- said lower portion being attached to a sidewall of said seat by at least one link to shift said handle from its retracted position, perpendicular to said seta, to an extended upright position, when the entire length of said handle is reclined backward away from said seat at a distance determined by the length of the arms of said link whereby pushing handles are provided for such apparatus when used as a stroller.

9. A convertible child support apparatus as recited in claim 8 wherein each said wheel unit further includes a hollow interior support tube leg having a plurality of telescopic extension tube legs contained within the hollow interior, each extension tube leg having a biased button for releasably locking said extension leg in its extended position whereby legs are provided for such apparatus when used as a highchair.

* * * * *

UNITED STATES PATENT AND TRADEMARK OFFICE
CERTIFICATE OF CORRECTION

PATENT NO. : 4,946,180

DATED : August 7, 1990

INVENTOR(S) : Luke Baer

It is certified that error appears in the above-identified patent and that said Letters Patent is hereby corrected as shown below:

Column 10, line 8, delete "seta", and substitute --seat--.

Signed and Sealed this

Twenty-eighth Day of July, 1992

*Attest:*

DOUGLAS B. COMER

*Attesting Officer*     *Acting Commissioner of Patents and Trademarks*